(No Model.)  16 Sheets—Sheet 1.

F. WILKINSON.
APPARATUS FOR READING AND PUNCHING JACQUARD CARDS FROM PATTERNS.

No. 507,954.  Patented Oct. 31, 1893.

Witnesses.

Inventor:
Frank Wilkinson.
By James L. Norris.
Atty.

(No Model.)  16 Sheets—Sheet 2.
F. WILKINSON.
APPARATUS FOR READING AND PUNCHING JACQUARD CARDS FROM PATTERNS.
No. 507,954.  Patented Oct. 31, 1893.
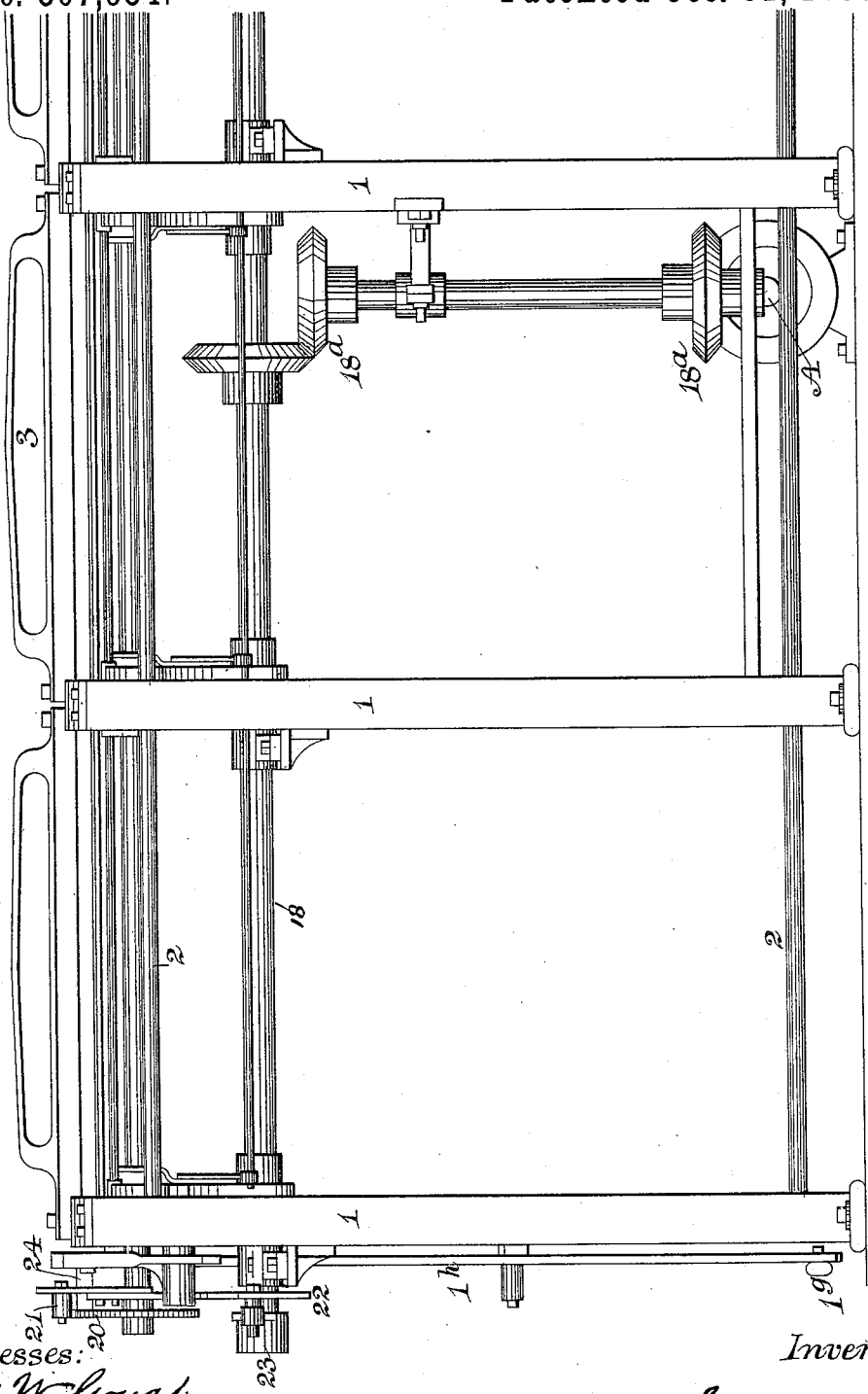
Witnesses:
H. W. Gough
J. H. Gough
Inventor:
Frank Wilkinson

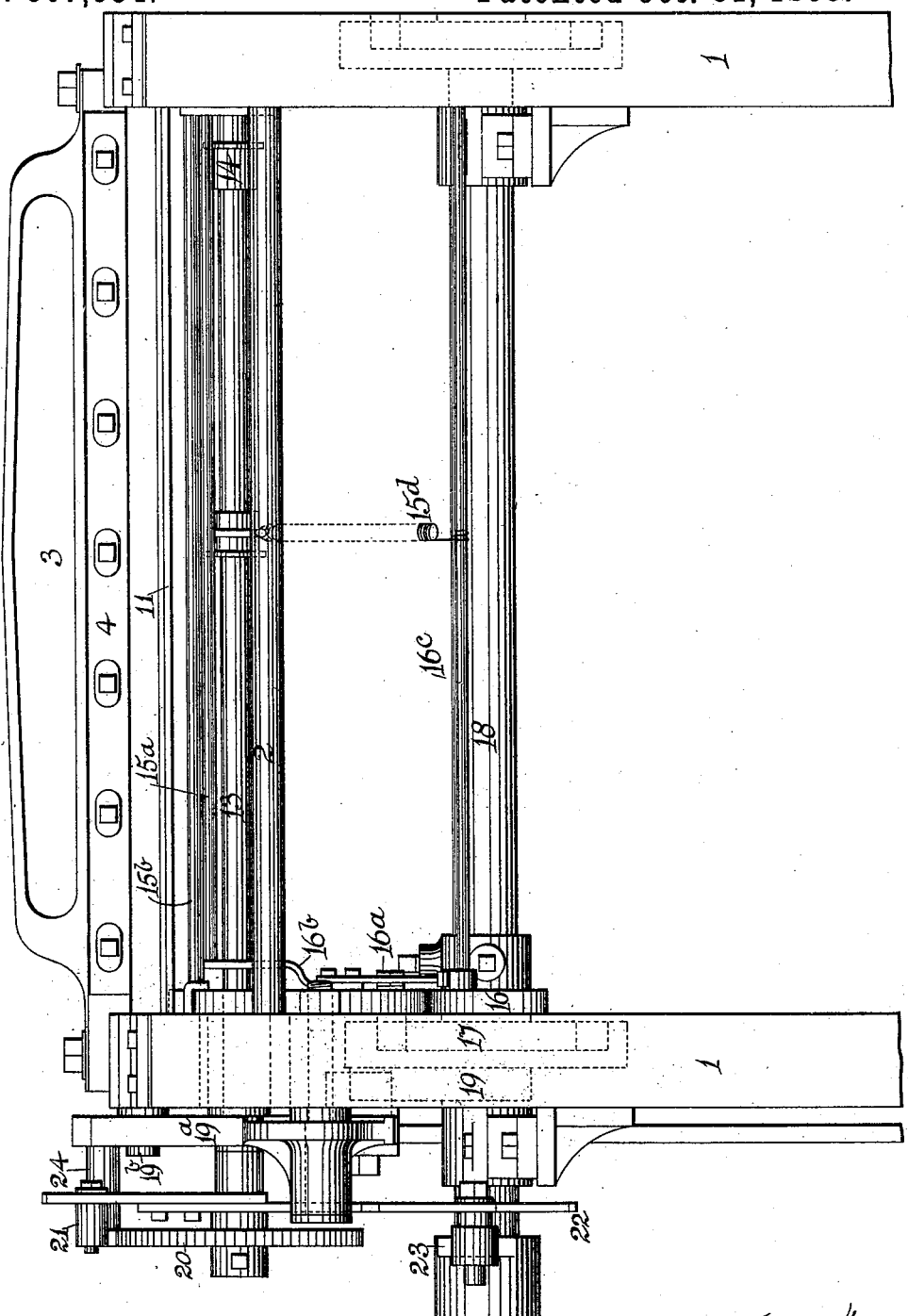

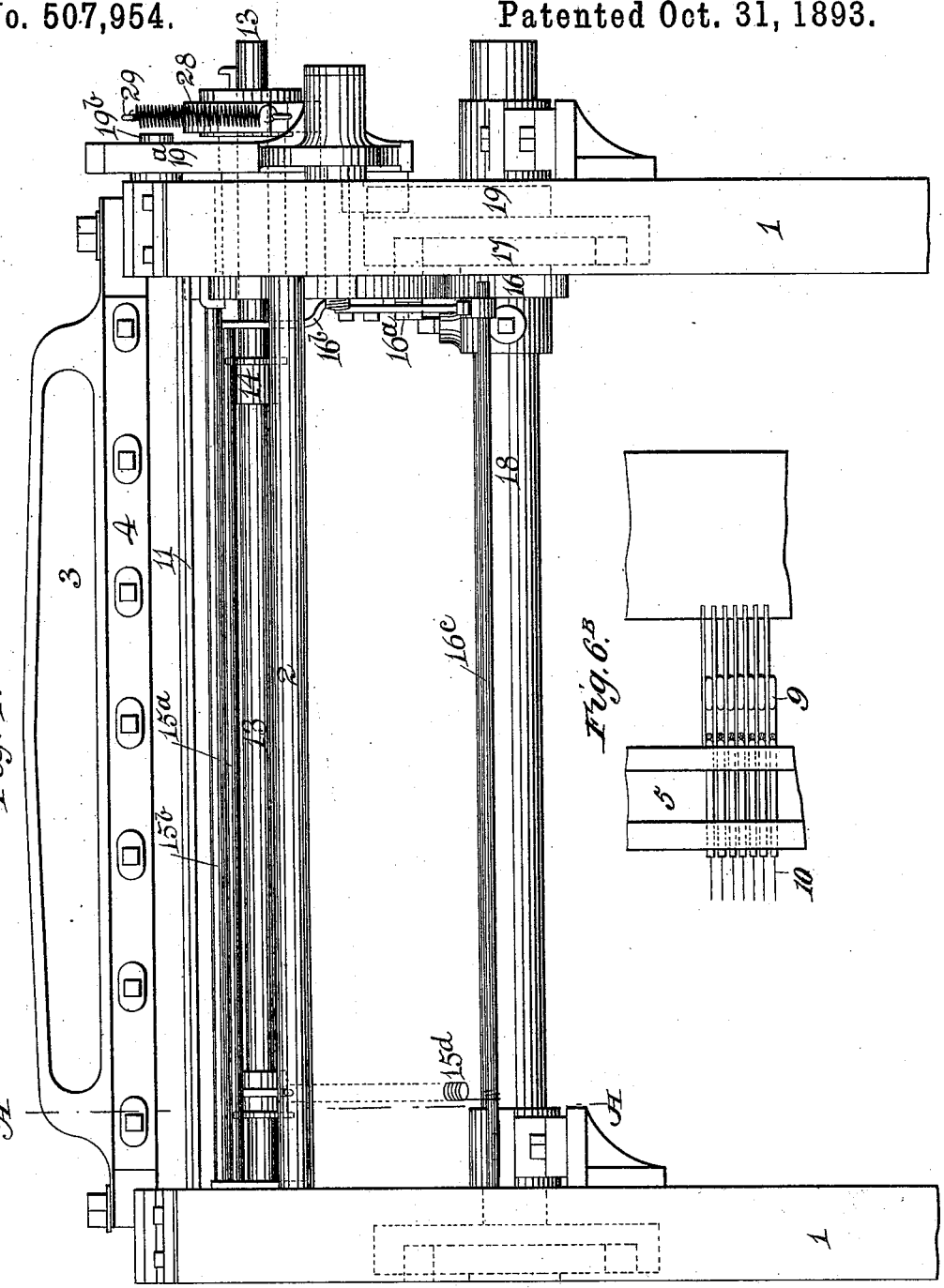

(No Model.) 16 Sheets—Sheet 5.

F. WILKINSON.
APPARATUS FOR READING AND PUNCHING JACQUARD CARDS FROM PATTERNS.

No. 507,954. Patented Oct. 31, 1893.

Witnesses:
H. W. Gough
J. H. Gough

Inventor:
Frank Wilkinson (No Model.) 16 Sheets—Sheet 6.
F. WILKINSON.
APPARATUS FOR READING AND PUNCHING JACQUARD CARDS FROM PATTERNS.
No. 507,954. Patented Oct. 31, 1893.
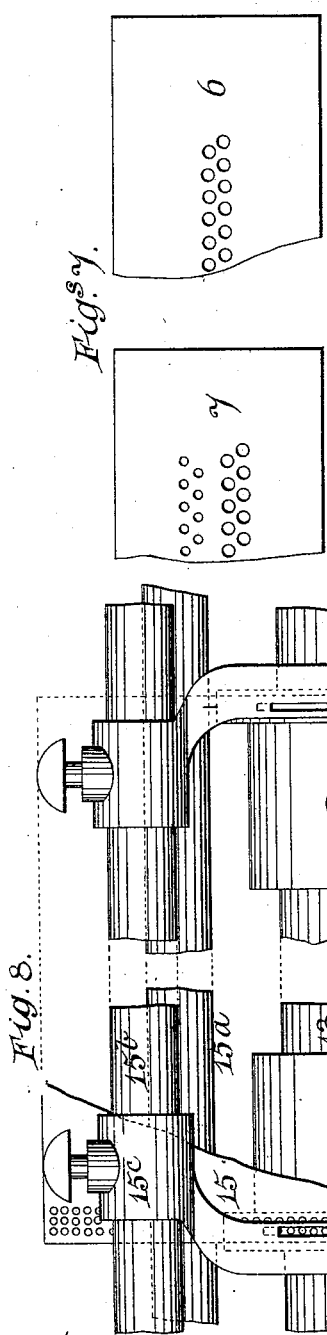
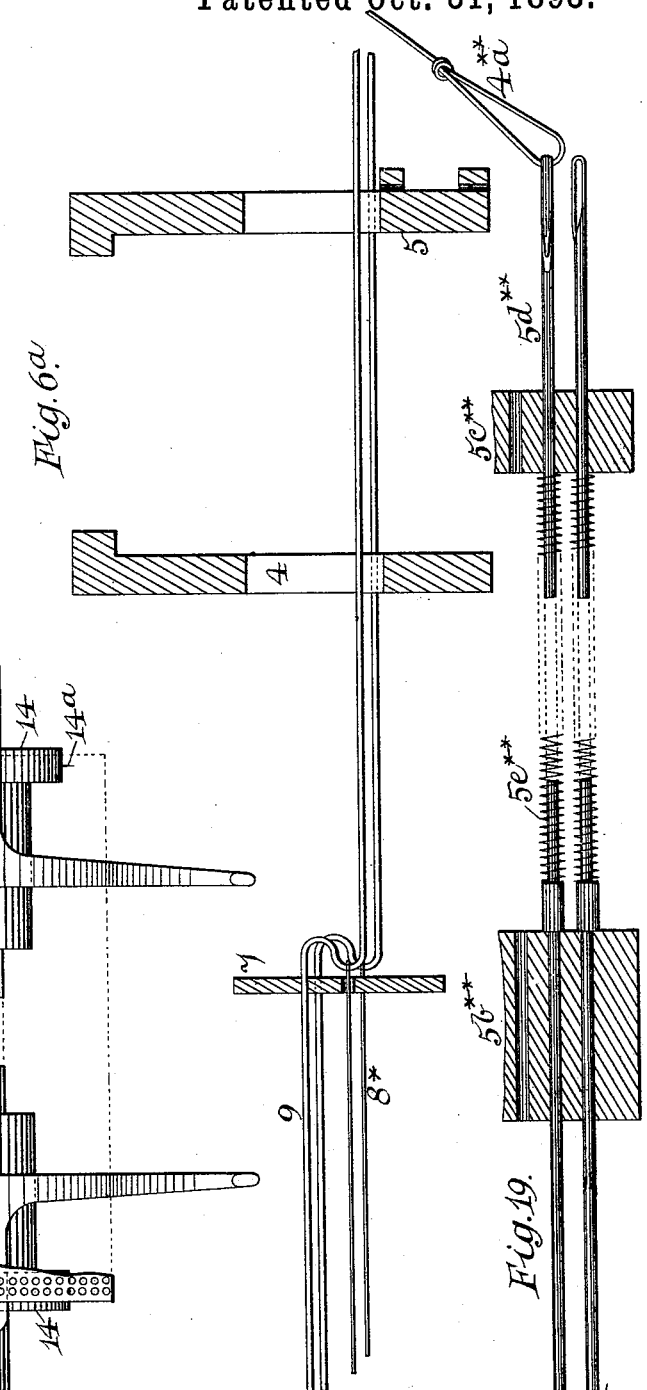
Witnesses:
H. W. Gough.
J. H. Gough.
Inventor.
Frank Wilkinson

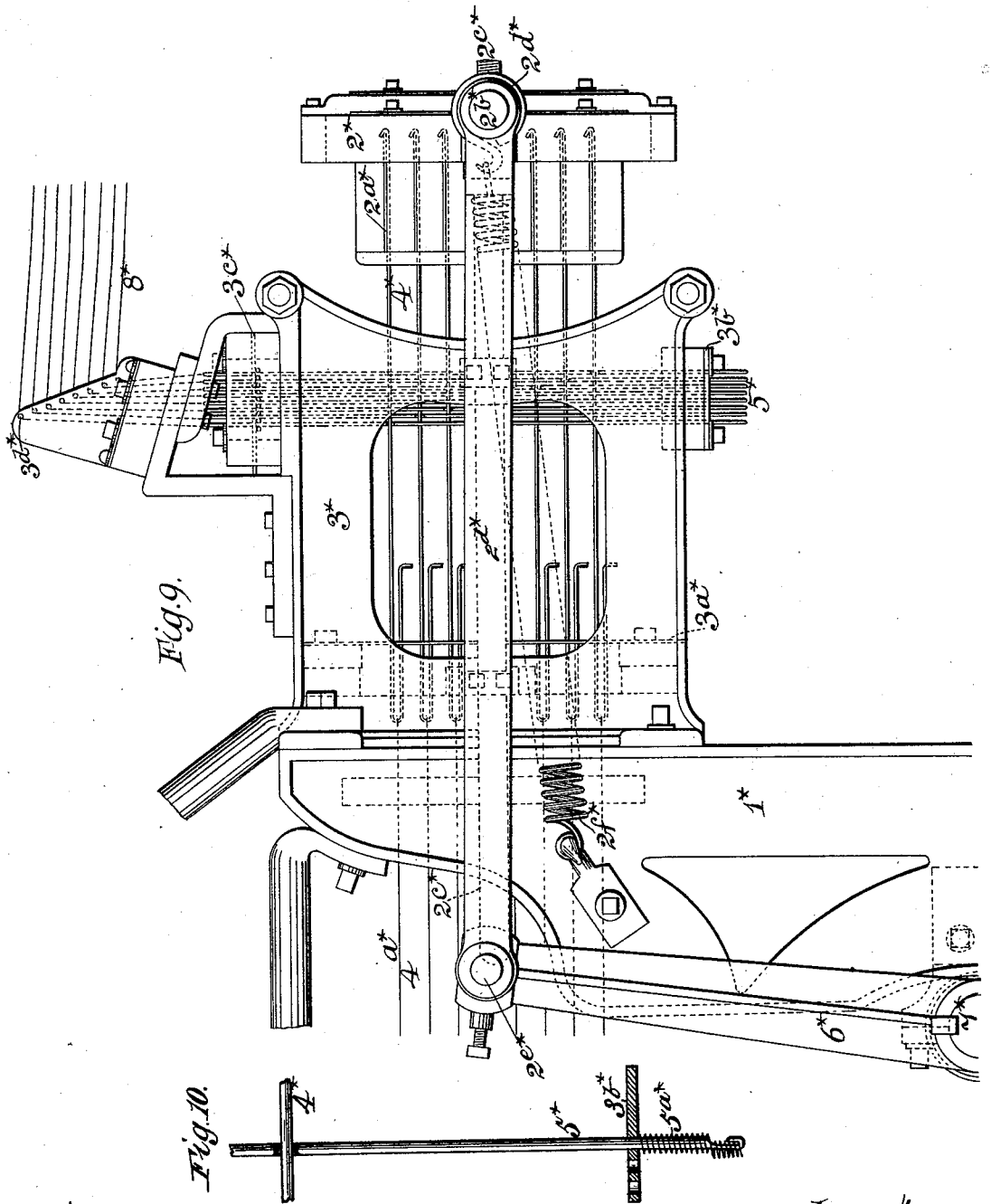

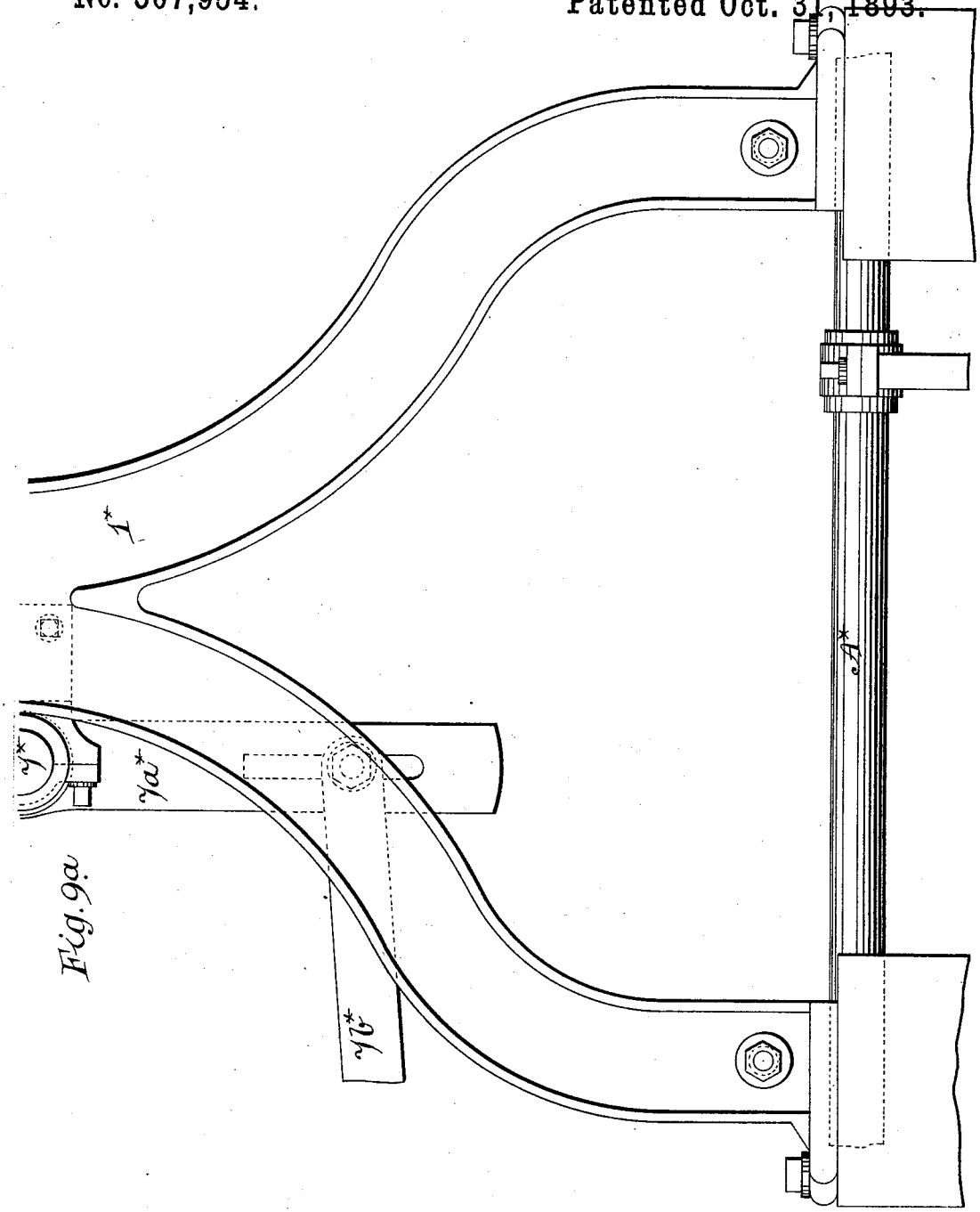

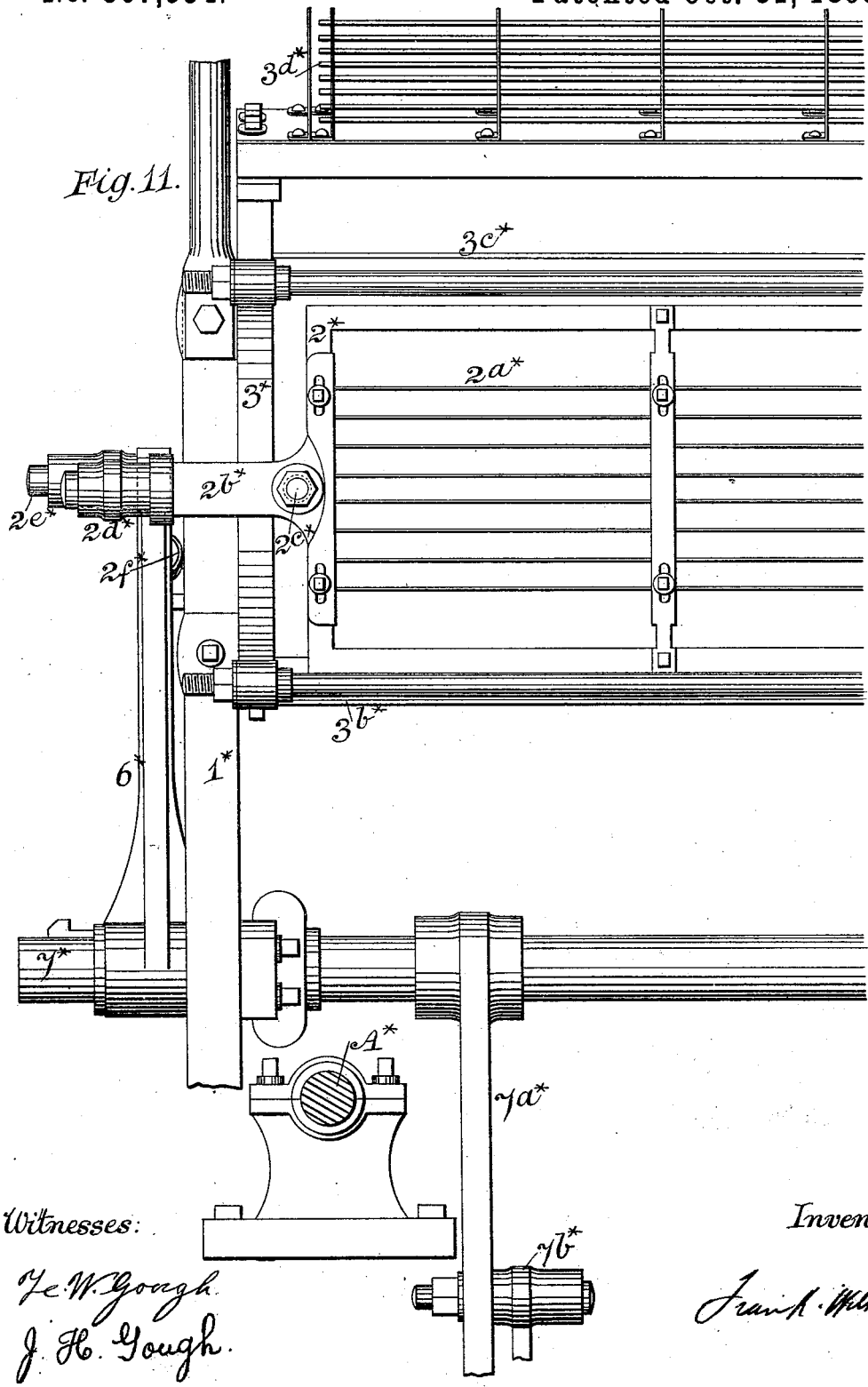

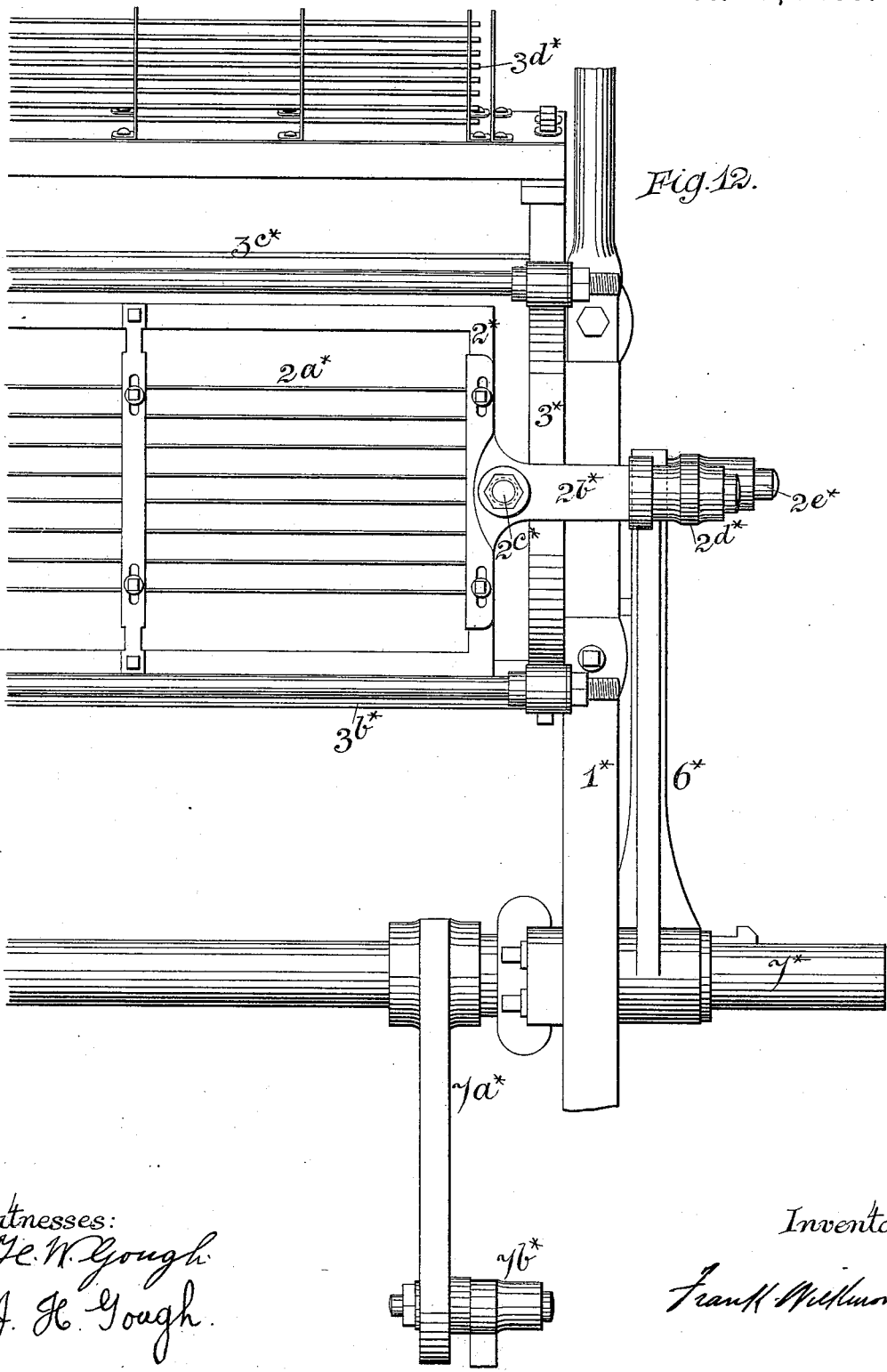

(No Model.) 16 Sheets—Sheet 11.

F. WILKINSON.
APPARATUS FOR READING AND PUNCHING JACQUARD CARDS FROM PATTERNS.

No. 507,954. Patented Oct. 31, 1893.

Witnesses:
H. W. Gough
J. H. Gough

Inventor.
Frank Wilkinson (No Model.)  16 Sheets—Sheet 12.

F. WILKINSON.
APPARATUS FOR READING AND PUNCHING JACQUARD CARDS FROM PATTERNS.

No. 507,954.  Patented Oct. 31, 1893.

Witnesses:
H. W. Gough.
J. H. Gough.

Inventor.
Frank Wilkinson.

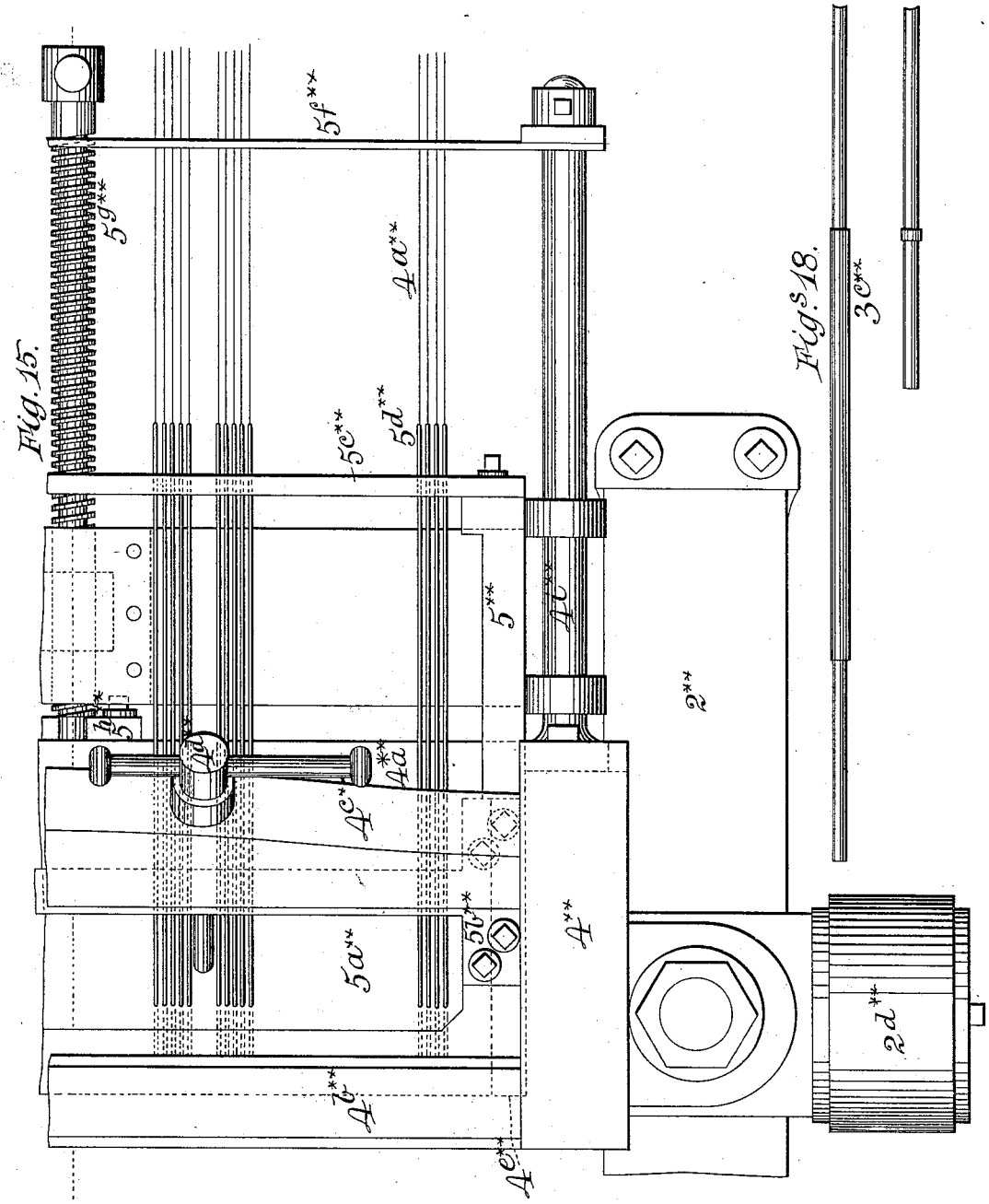

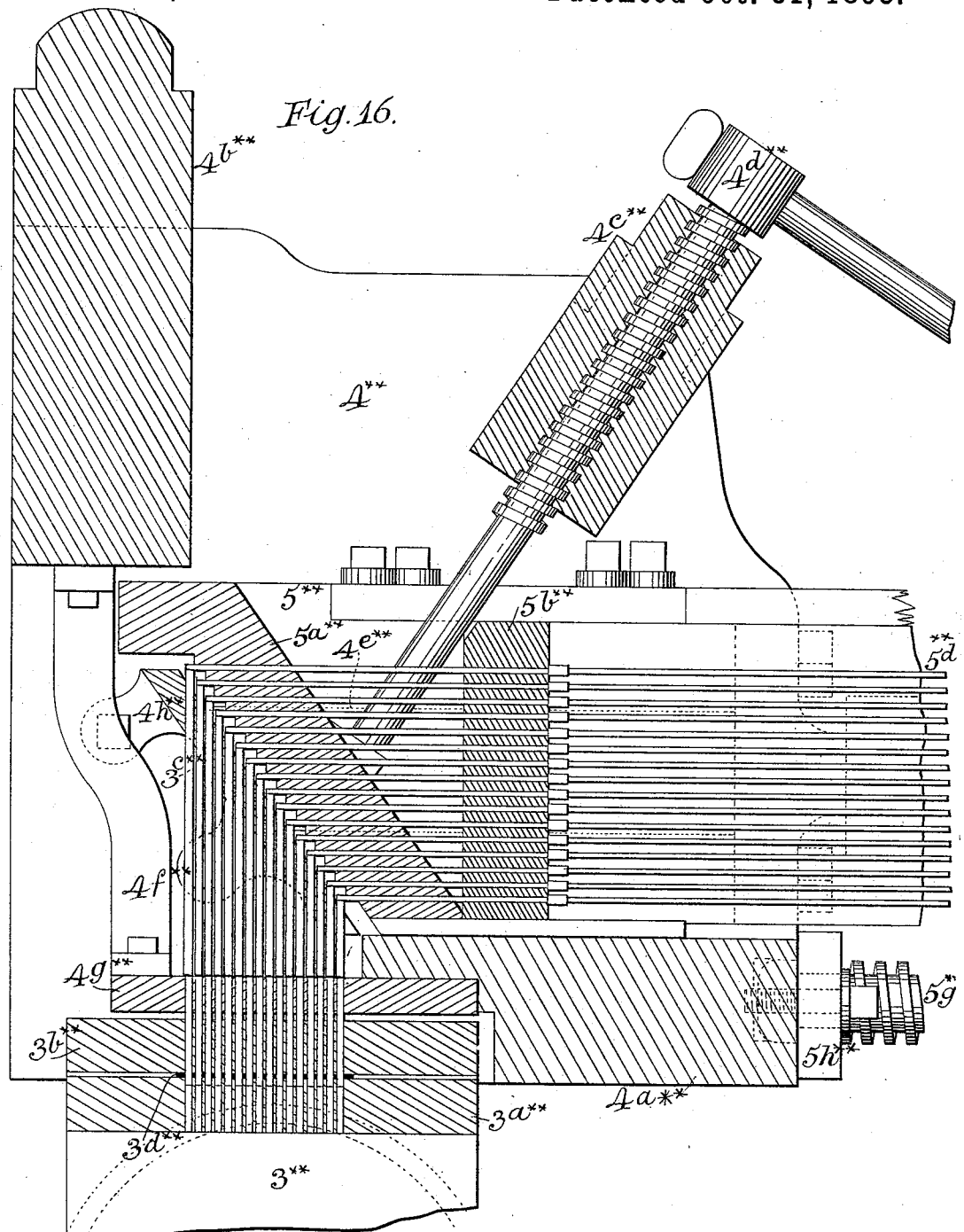

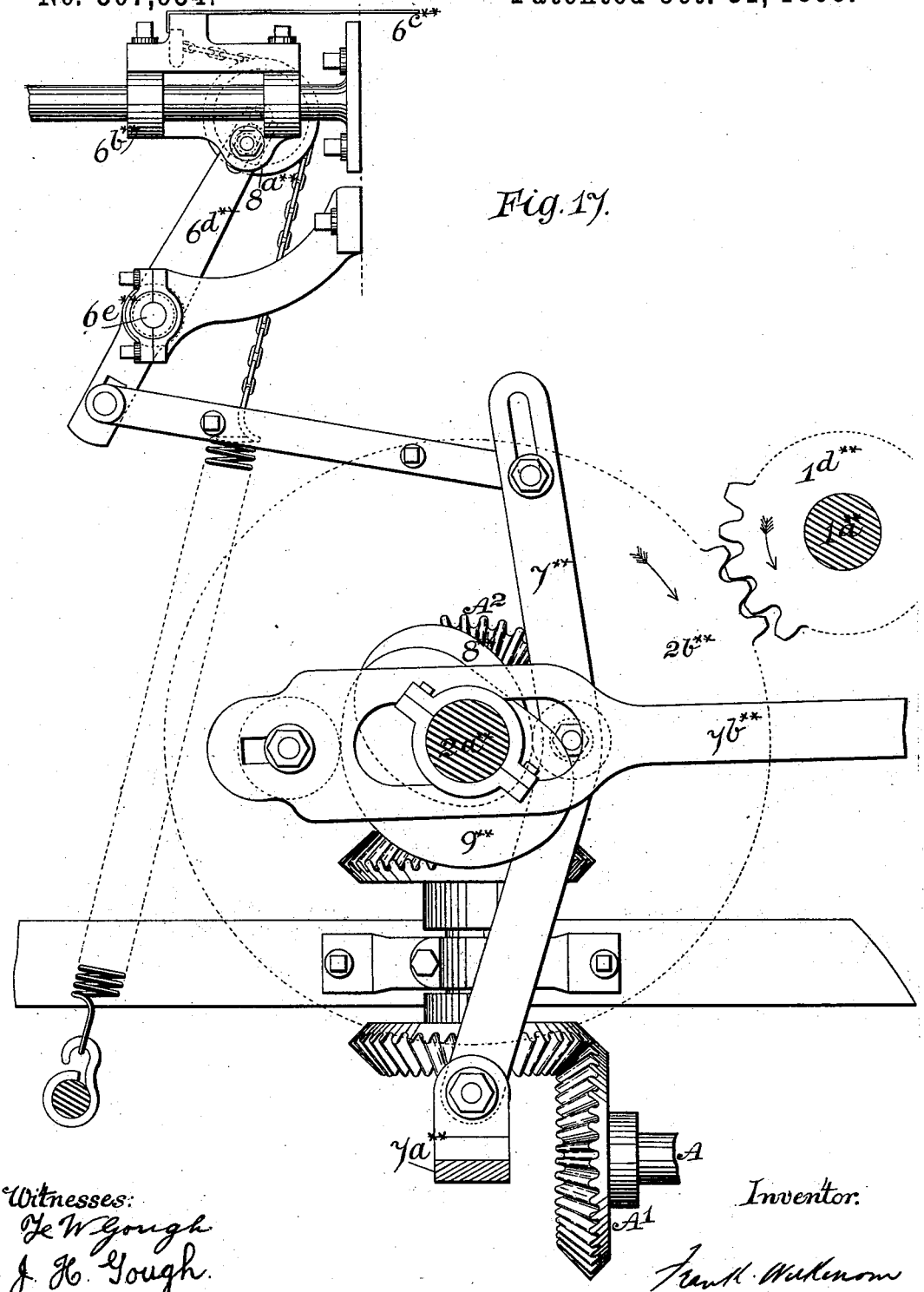

(No Model.) 16 Sheets—Sheet 16.
F. WILKINSON.
APPARATUS FOR READING AND PUNCHING JACQUARD CARDS FROM PATTERNS.
No. 507,954. Patented Oct. 31, 1893.
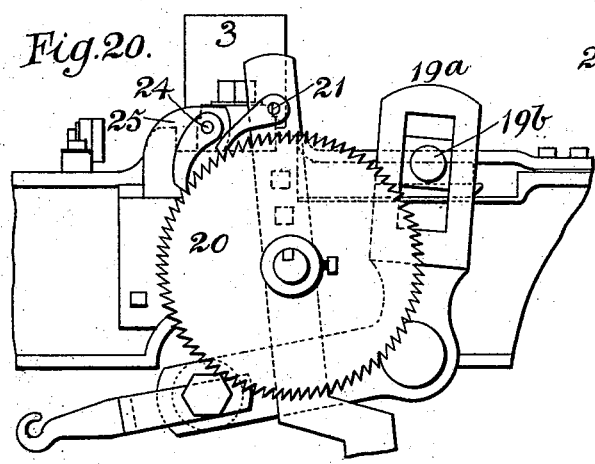
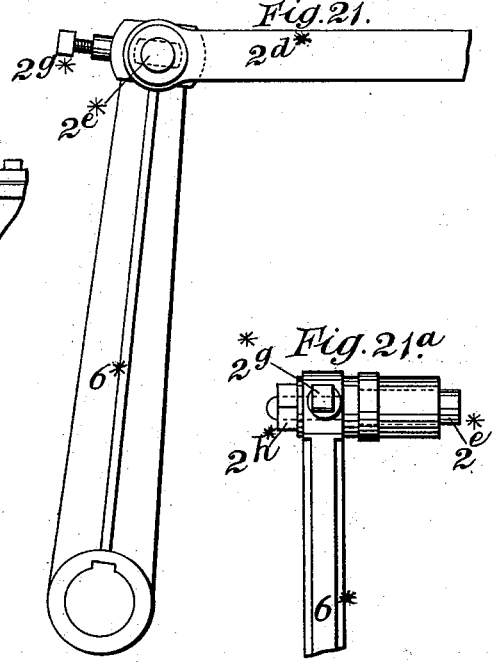
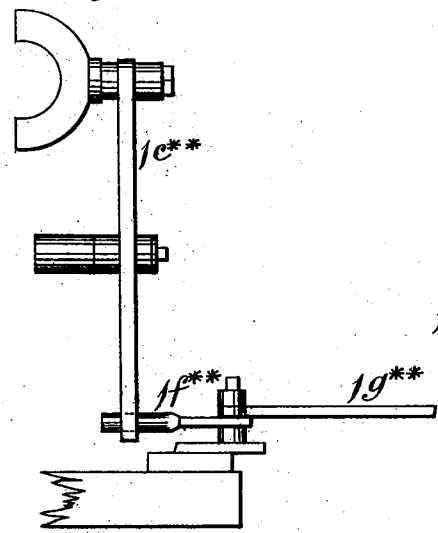
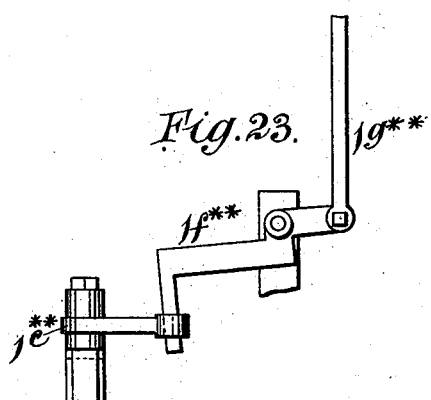
Witnesses.
Dennis Sumby.
Inventor.
Frank Wilkinson
By James L. Norris.
Atty.

UNITED STATES PATENT OFFICE.

FRANK WILKINSON, OF BEESTON, ENGLAND.

APPARATUS FOR READING AND PUNCHING JACQUARD CARDS FROM PATTERNS.

SPECIFICATION forming part of Letters Patent No. 507,954, dated October 31, 1893.

Application filed December 24, 1892. Serial No. 456,292. (No model.)

*To all whom it may concern:*

Be it known that I, FRANK WILKINSON, lace manufacturer, a subject of the Queen of Great Britain, and a resident of Beeston, Nottinghamshire, England, have invented certain new and useful Improved Apparatus for Reading, Selecting, and Punching Jacquard Cards Direct from a Drafted Pattern, of which the following is a specification, reference being had to the accompanying drawings.

Figures 1 to 6, 6$^A$, 7 and 8 illustrate the reading apparatus. Figs. 9, 9$^A$, 10, 11 and 12 the selecting apparatus, and Figs. 13 to 19 the Jacquard card punching apparatus.

Similar figures and letters of reference designate corresponding parts in the different figures where necessary.

Figure 1:
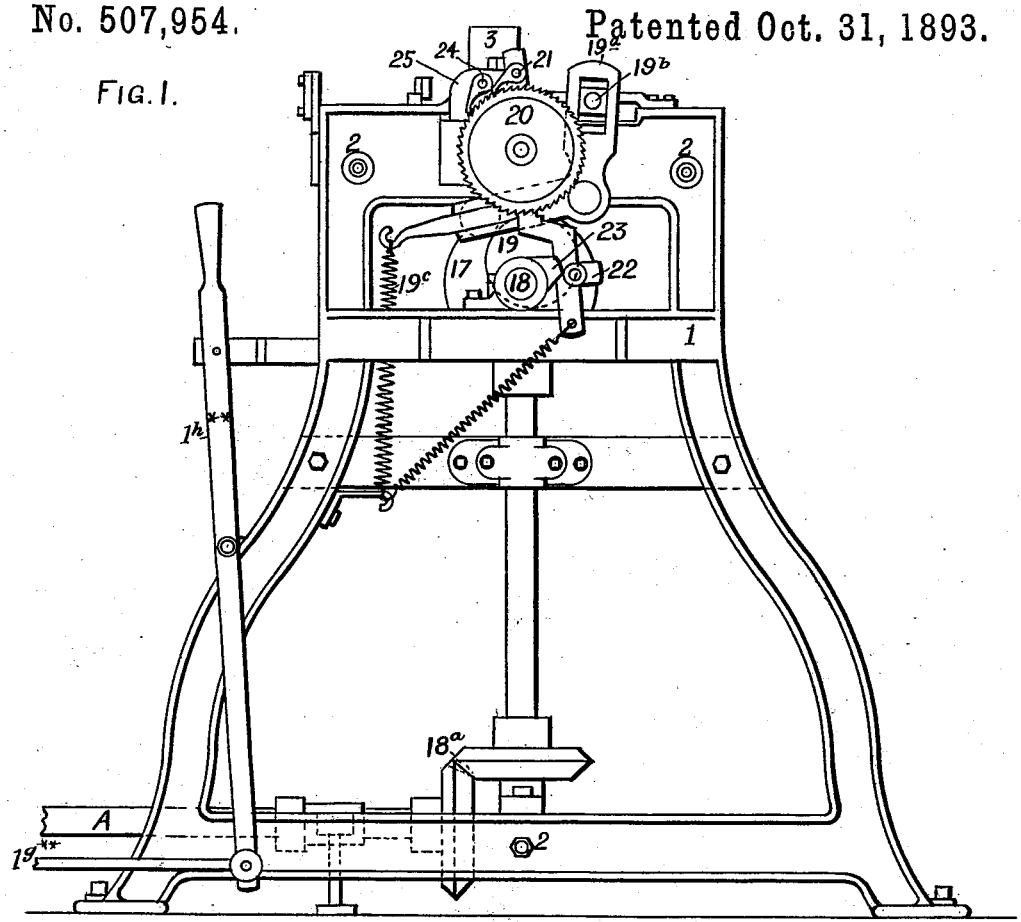
Figure 5:
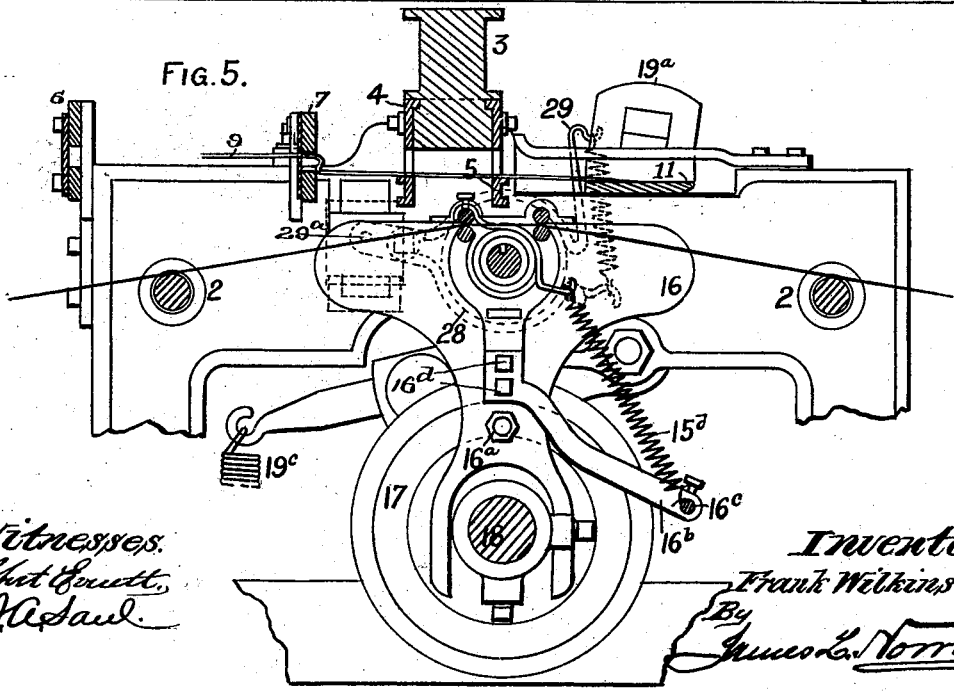
Figure 6:
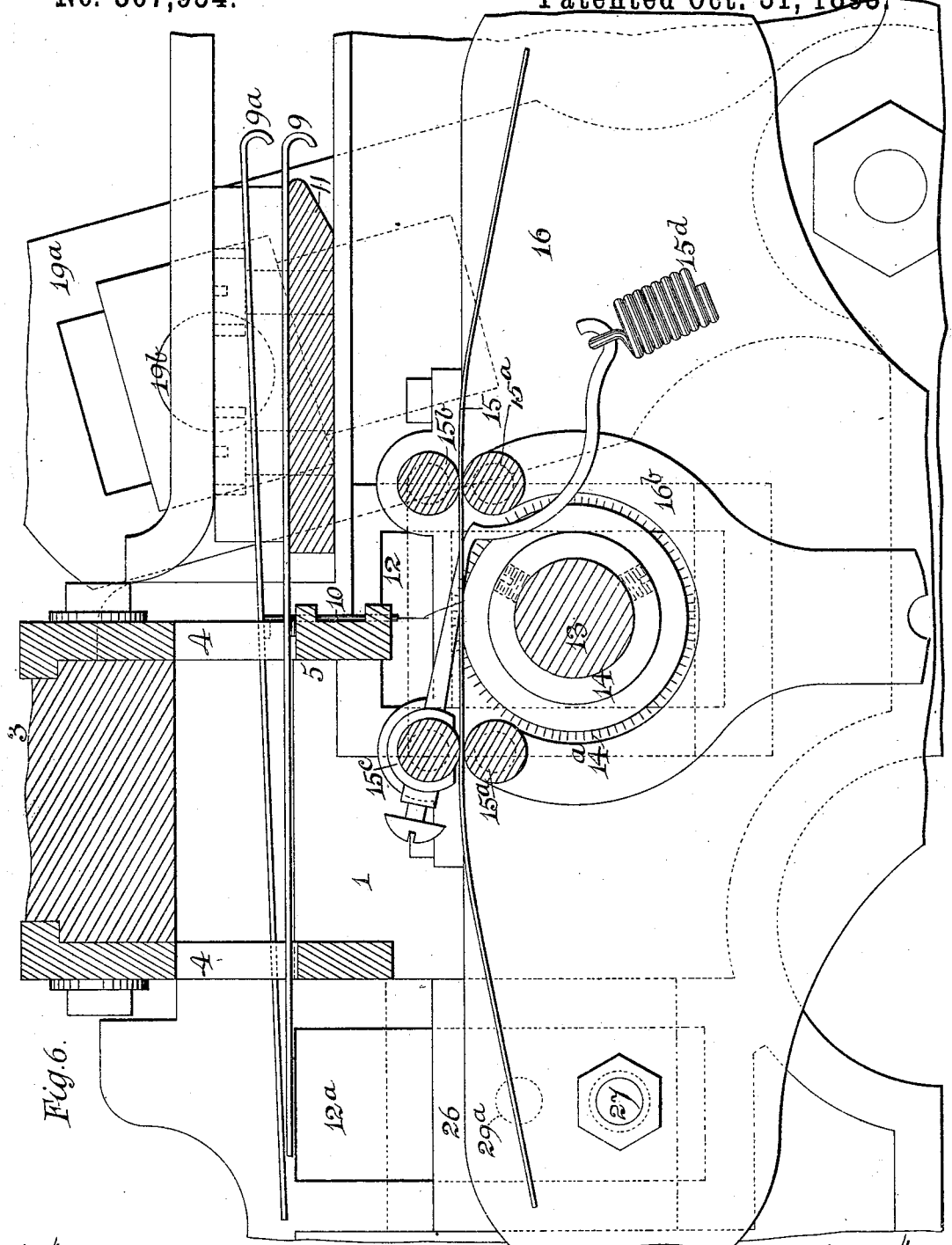
Figure 13:
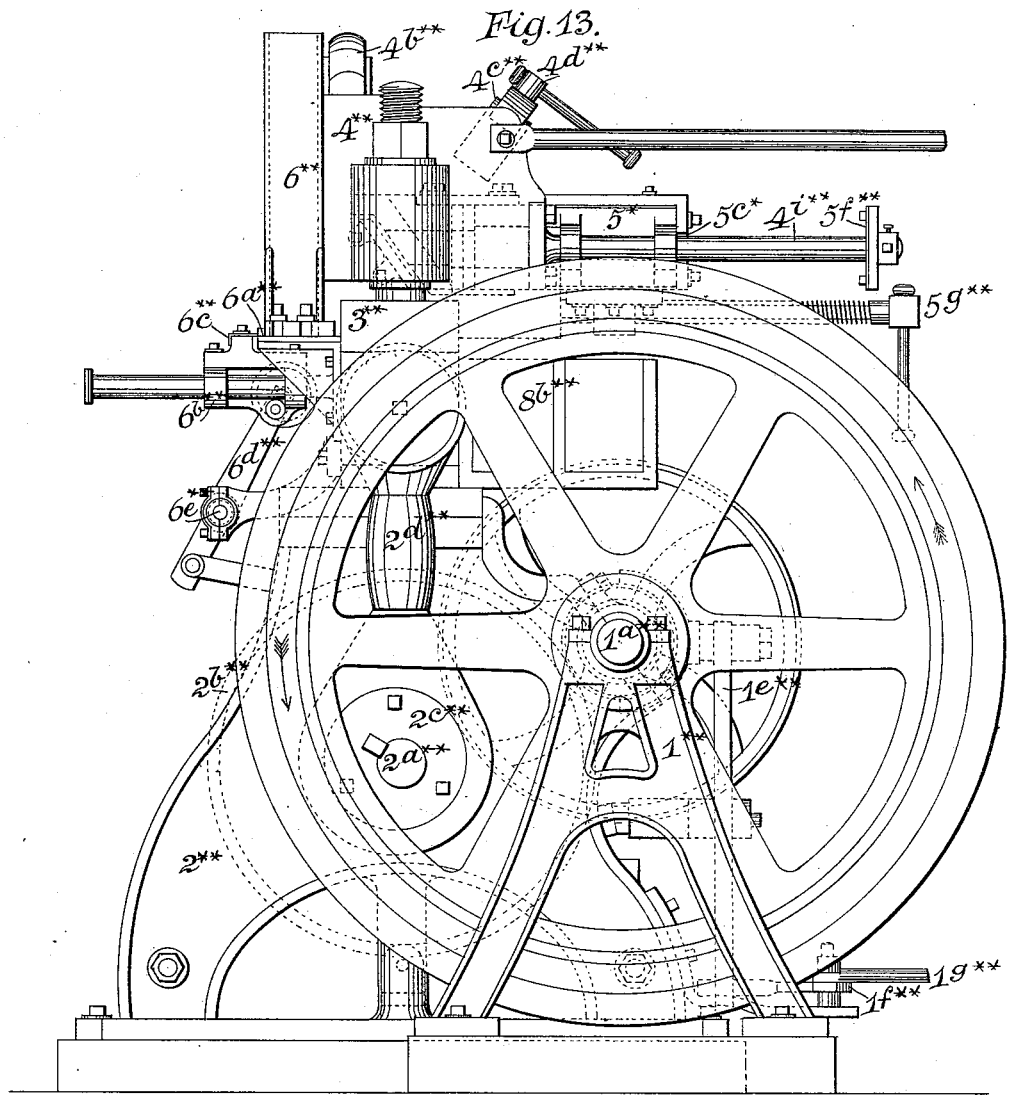
Figure 14:
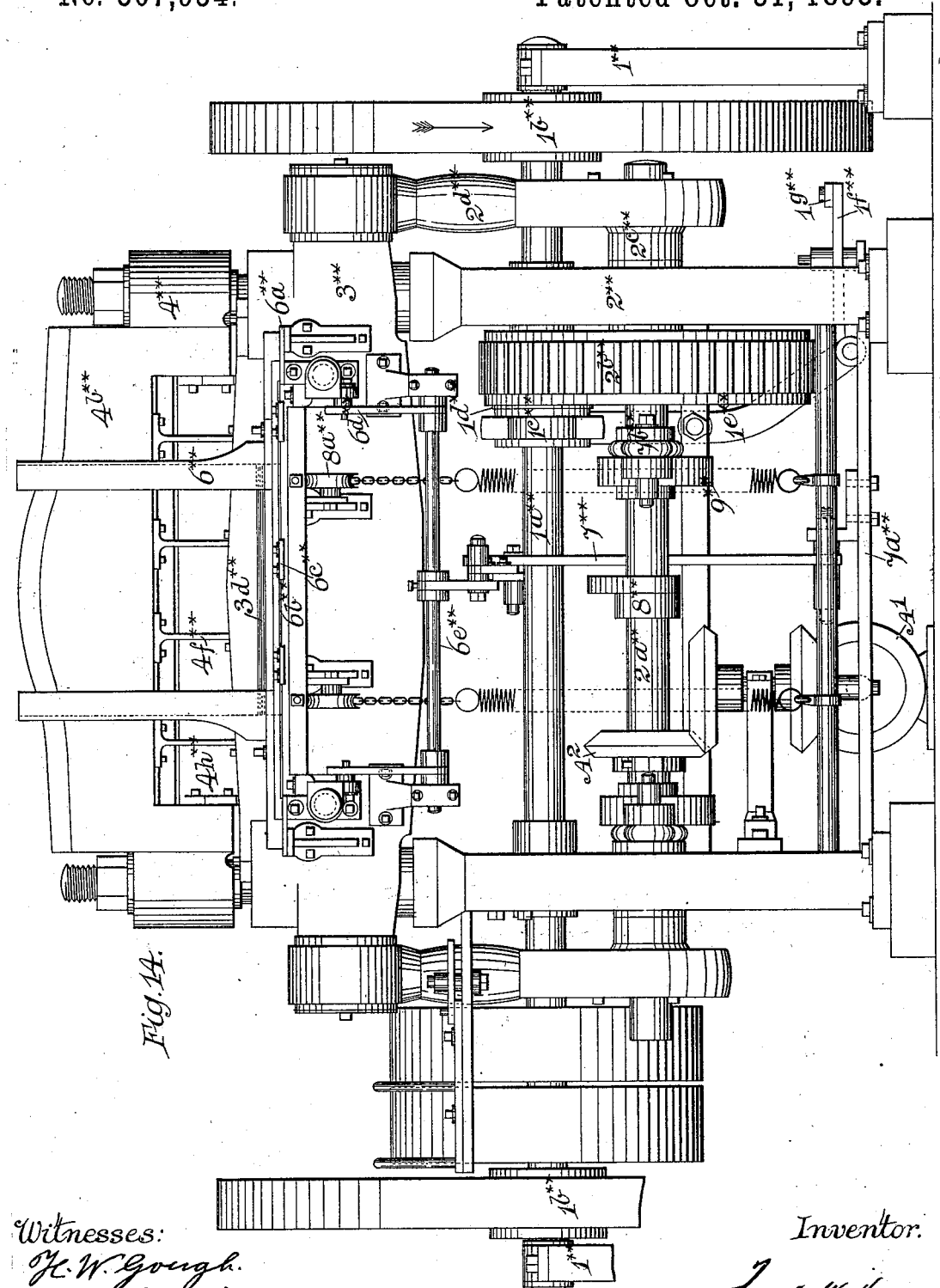

Fig. 1 is a left end view of the reading apparatus. Fig. 2 is a front view of the left and central divisions of the apparatus, showing in outline certain toothed gearing and a shaft A hereinafter referred to. Fig. 3 is an enlarged front view of the upper part of the left division; Fig. 4 an enlarged front view of the upper part of the right division. Fig. 5 is an enlarged sectional detail view of the upper part of the right division. Figs. 6 and 6$^a$ are full sized sectional views on the line A—A, Fig. 4 of some of the operating parts in each division of the apparatus. Figs. 6$^b$, 7 and 8 are full sized views of portions of the apparatus shown separately and severally referred to hereinafter including the sley 4, grooved bar 5, selecting needles 9, and vertical needles 10. Figs. 9 and 9$^a$ represent an end view of the selecting apparatus. Fig. 10 is a detail view of needles and sley forming part of the selecting apparatus. Figs. 11 and 12 represent a front view of the selecting apparatus. Figs. 13 and 14 show a left end view and a back view of the Jacquard card punching apparatus on an enlarged scale. Fig. 15 is a half plan of portion of the upper parts of the card punching apparatus. Fig. 16 is a vertical sectional view of the same. Fig. 17 shows a side view of the bevel toothed gearing employed and certain cams, levers, and connecting links. Fig. 18 is a view of the punches. Fig. 19 shows a side view of two selecting needles and portions of two vertical sleys hereinafter referred to. Fig. 20 is an enlarged detail view of a portion of the reading apparatus. Figs. 21 and 21$^a$ are detail views of portions of the selecting apparatus. Figs. 22 and 23 are detail views, hereinafter referred to, relating to the card-punching mechanism.

The reading apparatus consists of two end standards and two intermediate standards 1 connected at the bottom by a tie rod 2, (shown at Figs. 1 and 2) and at the top by two tie rods 2, and three tie bars 3 (shown at Figs. 1 to 6). Between each pair of standards the tie bar is provided at the back with a vertically slotted sley 4, and at the front with a like sley carrying at the bottom a grooved bar 5, the front flanges of which are perforated vertically to correspond with the sley above them. Behind the tie bar 3 the standards support two horizontally perforated sley plates 6 and 7 (shown at Fig. 5 and a front view of portion of each sley plate at Fig. 7). Through the sley 6 selecting strings 8 are passed their front ends being passed through the lower perforations in the sley 7 and tied to the lower bend of horizontal selecting needles 9, the back ends of the needles passing through the upper perforations in the sley 7. These needles also slide and are free to rise and fall in the slotted sleys 4. Beneath each selecting needle is a short vertical needle 10 (shown in side view at Fig. 6 and a front view at Fig. 6$^b$) free to rise and fall in the vertical perforations of the grooved bar 5. The front end of each horizontal selecting needle 9 terminates in a hook which engages with a horizontally sliding plate 11 except when it is lifted clear of the plate, by the vertical needle 10 beneath it, being raised by the following means: The four standards are slotted vertically at 12, and 12$^a$. In the slots 12 bearings slide to allow a roller 13 to rise and fall; on this roller between each pair of standards a pair of disks 14 are capable of adjustment to or from each other; the circumference of each disk has pins 14$^a$ projecting from it which engage with perforations near the edges of a sheet of zinc or other metal 15 on which the required pattern has been drafted.

The drafting of the pattern on the perforated sheet of metal is effected by the draftsman employing a moist compound, consisting of flake white ground up with gum arabic or other suitable cement and water which being allowed to dry sets hard filling up the perforations where required. When the drafting is quite dry and hard the perforated plate is ready to be placed under the vertical needles 10 of the reading apparatus. The compound filling the perforations in the plate as the plate rises lifts the vertical needles and raises the selecting needles 9 into the position $9^a$ to prevent them engaging with the sliding plate 11, and the perforations not filled allow the vertical needles to pass through leaving the selecting needles down in position to be moved by the sliding plate 11.

The perforated sheet 15 is held clear of the roller 13 by a rod $15^a$ at the back and another at the front of the roller, the sheet being held down by two other rods $15^b$ above it. The rods $15^a$ and $15^b$ are carried by and the roller 13 revolves in four bearing brackets 16 each provided with a stud and truck $16^a$ (shown at Figs. 3, 4 and 5). Each truck engages with a grooved cam 17 which causes the brackets, rods, and roller to rise and fall. The lower ends of the brackets 16, each form a fork which clips the boss of the cam 17. The ends of the lower rods $15^a$ are carried by the upper forked ends of brackets $16^b$ capable of adjustment vertically on the brackets 16 by means of screw bolts $16^d$, Fig. 5 to allow the rods $15^a$ to be lowered and give room for the insertion or withdrawal of the perforated plates 15.

To prevent any sidewise movement of the perforated plates and to insure the pins $14^a$ carried by the disks 14 engaging with the perforations near the edges of the plates, each edge is held on to a disk by the upper part of a bent lever $15^c$ (shown at Fig. 6) pressing upon it. The lever is slotted for a portion of its length to admit of the passage of the points of the pins $14^a$ which project through the perforations near the edge of the plate. The lower part of the lever $15^c$, clips the edge of the plate, and passes underneath it terminating in a hook engaging with the upper end of the coiled spring $15^d$. The lower end of each spring is attached to a rod $16^e$ carried by the lower ends of the adjustable brackets $16^b$.

Fig. 8 shows a plan view of portion of one edge of a perforated plate and the relative position of a pair of disks 14 carried by the roller 13.

The cams 17 are carried by a shaft 18, revolving in bearings secured to the standards. The shaft is caused to revolve by toothed gearing $18^a$ (shown only in outline at Figs. 1 and 2 the teeth being the same as shown at Fig. 17) connecting a main shaft A. By the side of each cam 17 within the right and left standards is a cam 19 which actuates a truck bearing lever $19^a$ rocking on an axle secured in the standard. The upper end of the lever is slotted to receive a bearing block carried by and free to turn on an axle pin $19^b$ secured to the end of the horizontal sliding plate 11. The truck is held to the cam by a spring $19^c$ hooked to it and the standard.

The left end of the roller 13 is provided with a ratchet toothed wheel 20 (shown in front view at Fig. 3 and in side view Figs. 1 and 20) moved by a pawl 21 on an axle carried by a lever 22 rocking on the roller 13, the lever being operated by a cam 23 on the left end of the cam shaft. The ratchet toothed wheel is retained by a stop lever 24 carried by a bracket 25 secured to a bearing 26 sliding in the vertical slot, $12^a$ of the left end standard. A similar bearing slides in the vertical slot $12^a$ of the right end standard. These bearings are each connected by an axle 27 (shown at Fig. 6) to one of the end brackets 16. The right end of the roller 13 carries a grooved disk 28 clasped by a break strap 29 (shown in front view at Fig. 4 and by dotted lines at Fig. 5) provided with a spring at the front and carried at the back by an axle pin $29^a$ projecting from a bearing 26 sliding in the vertical slot $12^a$ of the right end standard. The break strap prevents the roller 13 and ratchet wheel 20 from being overdriven.

The above arrangement allows the four bearings and roller 13, ratchet wheel 20, driver 21, lever 22, stop lever 24, bracket 25, bearings 26, axles 27 and $29^a$, grooved disk 28 and the break strap 29 to rise and fall with the brackets 16 at each revolution of the cam shaft 18. Each succeeding revolution places the next row of perforations in the sheet 15 exactly under the row of vertical needles 10 ready to make a fresh selection.

A left end view of the selecting apparatus is shown at Figs. 9 and $9^a$ and a front view at Figs. 11 and 12 consists of two standards 1* supporting a grid 2* provided with horizontal blades $2^{a*}$. From each end of the grid an arm $2^{b*}$ projects each carrying a rod $2^{c*}$ (shown by dotted lines at Fig. 9). Each rod slides horizontally in two bearings on the inner side of a bracket 3* secured to the standard. These brackets support a vertical slotted sley $3^{a*}$ (shown only at Fig. 9) in which the looped back ends of selecting needles 4* slide. Each selecting needle is hooked at its front end to engage with one of the blades $2^{a*}$ when held up to it. Each selecting needle 4* also lies within the bent portion of a vertical needle 5* (shown the full size at Fig. 10). The lower end of the needle passes through a horizontal sley $3^{b*}$ and the upper end through a sley $3^{c*}$ each supported by the bracket 3*. The lower end of the needle 5* is hooked and provided with a spring $5^{a*}$ beneath the sley $3^{b*}$. This spring pulls the needle down and holds the selecting needle 4* clear of the grid blade $2^{a*}$ except when it is pulled up into the position shown at Fig. 9 by the back end of a selecting string 8* attached to the upper end of the needle 5*, the front end of the string after passing over one of a series of wires $3^{d*}$ being tied to the lower bend of one of the selecting needles 9 of the reading apparatus before described. The looped back end of each selecting needle 4* has one or more strings $4^{a*}$ tied to it. The other end of each string is looped and hooked upon one end of a selecting needle of a Jacquard card punching machine. The to and fro movements of the grid $2^*$ with its blades $2^{a*}$ is effected by the outer end of each arm $2^{b*}$ forming an axle engaging with the front end of a link $2^{d*}$ its back end engaging with an axle $2^{e*}$ capable of adjustment in the upper end of a lever $6^*$ secured to a shaft $7^*$ rocking in bearings attached to the standards. The axle $2^{e*}$ adjustable in the slotted upper end of the lever $6^*$ by a set screw $2^{g*}$ and secured by a nut $2^{h*}$ is shown enlarged in left side view at Fig. 21 and in rear end view in Fig. $21^a$. The shaft is provided with two levers $7^{a*}$ attached to the front ends of connecting links $7^{b*}$ operated by cams $9^{**}$ on the main shaft of a Jacquard card punching apparatus hereinafter described. The back end of the links carries each a truck held to its cam by a coiled spring $2^{f*}$ hooked to the arm $2^{b*}$ and the side of the standard $1^*$.

The punching apparatus consists of two outer standards $1^{}$ (shown at Figs. 13 and 14) supporting a shaft $1^{a}$ provided with a fast and loose pulley and two fly wheels $1^{b}$. The shaft $1^{a}$ carries a clutch boss $1^{c}$ thrown into or out of connection with a wheel $1^{d}$, (partly shown in side view at Fig. 17) by a rocking lever $1^{c}$ connected with a right angled lever $1^{f}$ Figs. 22 and 23 hinged to a rod $1^{g}$ rocked by a handle $1^{h}$ hinged to its front end, the handle being carried by a stud secured to the left standard of the reading apparatus (shown at Figs. 1 and 2). The shaft $1^{a}$ is also supported by bearings at the front of a pair of standards $2^{}$ placed between the standards $1^{}$. The standards $2^{}$ form bearings for a shaft $2^{a}$ having a wheel $2^{b}$ fast on it driven by the wheel $1^{d}$. Each end of the shaft $2^{a}$ has an eccentric $2^{c}$ fitted on it. The rods $2^{d}$ of the eccentrics sustain a reciprocating bed $3^{}$ and move it up and down. The bed $3^{}$ carries a pair of vertically perforated punch plates $3^{a}$ $3^{b}$ (shown at Fig. 16) between which the card $3^{d}$ to be punched lies. Above the bed $3^{}$ is a fixed bed $4^{}$ supported at each end by the standards $2^{}$. This bed is formed of two end pieces $4^{}$, a bottom horizontal piece $4^{a}$, an upper vertical piece $4^{b}$, and an intermediate piece $4^{c}$, the whole forming one casting. The piece $4^{c}$ is set at an angle and provided with two clamping screws $4^{d}$ one of which is shown in plan at Fig. 15 and in section at Fig. 16. The ends of the fixed bed are slightly recessed on the inner side to receive the ends of a sley box $5^{}$. From each recess a block $4^{e}$ projects and enters a slot cut in the ends of the sley box. The block is shown by dotted lines only.

To the under side of the vertical piece $4^{b}$ of the fixed bed four brackets $4^{f}$ are secured. Their lower ends carry the back edge of a vertically perforated plate $4^{g}$. The front edge of the plate is secured to the under side of the horizontal piece $4^{a}$. Above the plate $4^{g}$ an angular plate $4^{h}$ is secured to the ends of the fixed bed. This plate is perforated vertically, the perforations in it and the three plates $4^{g}$, $3^{b}$ and $3^{a}$ being in line. The four plates support the required number of rows of punches $3^{c}$ two of which a short one and a long one are shown the full size at Fig. 18. The punches are prevented from falling through the plates by being made somewhat thicker above the plate $4^{g}$. The sley box forms an angular sley plate $5^{a}$ at its back end, and a vertical sley plate $5^{b}$ in front of it. The front end of the box carries a vertical sley plate $5^{c}$. The three plates are perforated horizontally. In the perforations horizontal selecting needles $5^{d}$ slide. The front end of each needle forms a spring hook (shown at Fig. 19) upon which the back looped end of a string $4^{a}$ of the selecting apparatus is hooked. In front of the sley $5^{b}$ each needle is provided with a collar. Between the collar and the sley $5^{c}$ each needle has a spring $5^{e**}$ coiled round it.

The springs pressing upon the collars and the back of the sley $5^{c}$ hold the needles in the position shown at Fig. 16, with the back end of each needle protruding through the sley $5^{a}$ and lying over the tops of the punches $3^{c}$ beneath them prevent them from rising, the lower ends of the punches cutting through the card $3^{d}$ as the bed $3^{}$ and punch plates $3^{a}$ $3^{b}$ rise, except when the back end of any selecting needle is drawn away from the top of its punch by the string $4^{a}$. The punch then rises with the card instead of cutting through it. From each side of the sley box $5^{}$ near the front end two arms project which slide upon a rod $4^{i}$ secured to the front of the bed $4^{}$. The front ends of the rods carry a vertical sley plate $5^{f}$ held by a set screw at each end. Through this sley the strings $4^{a}$ pass. Before hooking the strings on the needles, the sley $5^{f}$ is released, moved backward, and passed over the spring hooks of the needles. Then when all the strings have been hooked on them, the sley is moved toward the front and secured in the position shown at Fig. 15. Beneath the front of the sley box a plate is secured, provided at its center with a screw threaded nut carrying a screw $5^{g}$ grooved at its back end, and turning in a slotted bearing plate $5^h$ secured to the front of the fixed bed. When the clamping screws $4^{d}$ are unscrewed the sley box with its selecting needles and springs may be moved away from the punches by the screw $5^{*g*}$ when a punch is broken to insert a new one, or when a fresh selection of strings has to be hooked on the selecting needles. After the sley box, with its needles, has been returned to the position shown at Figs. $15^{}$ and $16^{}$, upon the clamping screws being turned down it will be held fast while the cards are being punched. The blank cards $3^{d}$ are placed between a pair of grooved bottomless arms $6^{}$ (shown at Figs. 13 and 14) capable of adjustment to or from each other according to the length of card to be punched on a plate $6^{a}$ supported by four brackets carried by the back of the movable bed 3.

The card to be punched is placed between the punch plates 3^a 3^b by the following means (shown at Figs. 13 and 14 and in side view at Fig. 17): From the back of the movable bed two rods project on which the ends of a bar 6^b slide. On the top of the bar two or more thin plates 6^c are capable of adjustment to or from each other. The front ends of the plates lie on the back edge of the plate 6^a. The bar 6^b and the plates 6^c are moved backward and forward by the upper slotted ends of two levers 6^d engaging with studs carried by the bar 6^b. The lower ends of the levers are secured on a shaft 6^e rocking in bearings secured to the back of the movable bed. The shaft carries a lever connected by a link to the upper end of a lever 7, the lower end rocking upon an axle fixed to a cross bar 7^a secured to the standards 2. The lever 7 carries a truck operated by a cam 8 on the shaft 2^a. The bar 6^b has two chains each passed over a pulley 8^a, and attached to the upper end of a coiled spring, the lower end of each spring being hooked to a tie rod at the back of the standards 2. The springs hold the truck lever 7 up to the cam 8 causing the plates 6^c to push the bottom card from beneath the grooved arms 6 into its right position between the punch plates 3^a 3^b to be punched. The cam then forces the lever 7 toward the front, to move the plates 6^c backward ready to push forward the next card to be punched. The punched cards fall into a box 8^b, secured to the front of the movable bed. The shaft A which actuates the toothed gearing 18^a of the reading apparatus, carries a toothed bevel wheel A' at its back end driven by gearing connecting it to a wheel A^2, carried by the shaft 2^a. This shaft also carries two cams 9 which operate the links 7^b* of the selecting apparatus. The combined movements of the reading, selecting and punching apparatus are as follows:

When the selecting needles 9 of the reading apparatus are moved toward the front by the sliding plate 11, the strings 8 pull up the vertical needles 5* of the selecting apparatus lifting the hooked ends of the needles 4* to engage with the blades 2^a* of the grid. As the grid moves toward the front the strings 4^a attached to the horizontal selecting needles 5^d of the punching apparatus draw the needles away from the tops of the punches 3^c which are lifted up by the card as the punch plates 3^a 3^b rise leaving the card unpunched. The unselected needles 5^d which remain over the punches 3^c** force them through the card as the punch plates rise, a card being punched each time the drafted sheet of metal 15 makes a selection.

By the employment of apparatus operating automatically as above described I am enabled to dispense with reading the pattern from the draft, to insert selecting lathes in a reading machine and with an attendant to change the lathes at a punching machine, and also with one or more attendants at a separate punching machine.

What I claim is—

1. In a combined reading, selecting and punching machine for punching Jacquard cards from a drafted pattern the means for operating the pattern sheet consisting of feeding disks 14 having teeth 14^a engaging with holes in the edge of the pattern sheet, and adjustable on a roller 13 to suit sheets of different widths, bearing brackets 16^b carrying rods 15^a for supporting the pattern sheet, spring controlled holding down levers 15^c, a cam actuated pawl 21 for intermittently rotating the feeding disks, a brake strap 29 to prevent overwinding, and means for raising the feed sheet after each intermittent feed to cause same to engage vertical pins 10 which control the selecting needles, substantially as described.

2. In a combined reading, selecting and punching machine for punching Jacquard cards from a drafted pattern, the combination of a grid 2, guides for same, means for reciprocating said grid, hooked selecting needles 4 supported in a sley 3^a and adapted to engage the bars of said grid 2, vertical needles 5 engaging said needles 4 and supported in sleys 3^b, 3^c, springs 5^a for normally depressing said needles, and thereby disengaging the needles 4 from the bars of the grid 2, and selecting strings 8 which pass over guide wires 3^d and connect the needles 5 with the selecting needles 9 of the reading apparatus whereby when any string 8 is pulled the corresponding needle 5 is raised against the pull of its spring 5^a and the corresponding selecting needle 4 is thereby brought into engagement with the grid 2, substantially as described.

3. In a combined reading, selecting, and punching machine for punching Jacquard cards from a drafted pattern, the combination with the punches of a fixed bed for receiving the thrust of the punches, and a sley block for carrying the selecting needles 5^d, said block being adapted to slide in said fixed bed, to and away from the punches, substantially as described for the purpose specified.

4. In a combined reading, selecting, and punching machine for punching Jacquard cards from a drafted pattern, the combination of a fixed bed for receiving the thrust of the punches, guides for the punches fixed to said bed, a sley block for carrying the selecting needles 5^d* said block being adapted to slide in the fixed bed to and away from the punches, means for withdrawing said sley block away from the punches, and clamping screws 4^d* for securing the sley block to the fixed bed when in the working position, substantially as described.

5. In a combined reading, selecting, and punching machine for punching Jacquard cards from a drafted pattern, the combination of a fixed bed for receiving the thrust of the punches, said bed being made up of end pieces 4, rear vertical piece $4^{b**}$, base piece $4^{a*}$ and inclined piece $4^{c}$ carrying clamping screws $4^{d}$, sley plates $4^{g}$ and $4^h$ carried by brackets $4^{f}$ and serving as guides for the punches $3^{c}$, a sley block $5^{}$ for carrying the selecting needles $5^{d}$ said block being adapted to slide in guides in the fixed bed to and away from the punches, guide rod $4^{i}$ carrying a sley plate $5^{f}$ through which the needle operating strings $4^{a}$ pass, and a screw $5^{g*}$ for withdrawing the block 5 when released by the clamping screws $4^{d**}$, substantially as described.

6. In a combined reading, selecting, and punching machine for punching Jacquard cards from a drafted pattern, the combination, with the punching mechanism, of mechanism for feeding thereto the cards to be punched, said mechanism consisting of the arms $6^{}$ adjustably fixed on a plate $6^{a}$ behind the punching bed, adjustable feeding plates $6^{c}$ mounted on a sliding carriage $6^{b}$, and a cam $8^{}$ on the driving shaft operating through levers $7^{}$, and $6^{d**}$ in conjunction with a spring to operate the said carriage, substantially as described.

In witness whereof I have hereunto set my hand this 12th day of December, 1892.

FRANK WILKINSON.

Witnesses:
  H. W. GOUGH, C. E.,
  J. H. GOUGH.